United States Patent
Shimomura et al.

(10) Patent No.: US 12,359,402 B2
(45) Date of Patent: Jul. 15, 2025

(54) WORK VEHICLE

(71) Applicant: HITACHI CONSTRUCTION MACHINERY CO., LTD., Tokyo (JP)

(72) Inventors: Takuya Shimomura, Tsuchiura (JP); Masaki Yoshikawa, Kasama (JP); Tetsuji Tanaka, Abiko (JP); Isamu Aoki, Tsukuba (JP); Kazuyuki Ito, Kobe (JP); Kouji Shimazaki, Akashi (JP); Keisuke Naitou, Kobe (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 514 days.

(21) Appl. No.: 17/907,990

(22) PCT Filed: Sep. 15, 2021

(86) PCT No.: PCT/JP2021/033823
§ 371 (c)(1),
(2) Date: Aug. 30, 2022

(87) PCT Pub. No.: WO2022/065143
PCT Pub. Date: Mar. 31, 2022

(65) Prior Publication Data
US 2023/0085666 A1 Mar. 23, 2023

(30) Foreign Application Priority Data
Sep. 23, 2020 (JP) .................. 2020-158816

(51) Int. Cl.
*E02F 9/22* (2006.01)
*F16H 61/4008* (2010.01)

(52) U.S. Cl.
CPC ....... *E02F 9/2253* (2013.01); *F16H 61/4008* (2013.01)

(58) Field of Classification Search
CPC ..... E02F 9/2253; E02F 9/2289; E02F 9/2296; E02F 9/264; E02F 9/2246; F16H 61/4008
See application file for complete search history.

(56) References Cited

U.S. PATENT DOCUMENTS

2015/0098783 A1* 4/2015 Hyodo ................. E02F 9/0883
 414/685
2018/0251026 A1* 9/2018 Nukii .................... B60W 10/04
(Continued)

FOREIGN PATENT DOCUMENTS

JP 02-279841 A 11/1990
JP 2011-122706 A 6/2011
(Continued)

OTHER PUBLICATIONS

International Search Report of PCT/JP2021/033823 dated Nov. 22, 2021.

*Primary Examiner* — Khoi H Tran
*Assistant Examiner* — Nhi Q Bui
(74) *Attorney, Agent, or Firm* — MATTINGLY & MALUR, PC

(57) ABSTRACT

Provided is a work vehicle capable of reducing the fuel consumption while maintaining the working efficiency. A wheel loader 1 comprising a vehicle body controller 5, 5A for controlling an engine 41, wherein the vehicle body controller 5, 5A limits an upper limit rotational speed of the engine 41 based on an accelerator pedal step-on amount α, a brake pedal step-on amount β, a torque converter speed ratio e which is a ratio of a rotational speed of a torque converter 42, a discharge pressure P1 of a loading hydraulic pump 44, and a stroke amount S1 of lift arm cylinders 22 or a stroke amount S2 of a bucket cylinder 24.

4 Claims, 12 Drawing Sheets

(56) References Cited

U.S. PATENT DOCUMENTS

| | | | |
|---|---|---|---|
| 2019/0194908 A1* | 6/2019 | Ogura | E02F 9/265 |
| 2020/0165987 A1* | 5/2020 | Cunningham | B60W 20/00 |
| 2020/0248436 A1* | 8/2020 | Hyodo | E02F 9/2253 |
| 2021/0053566 A1* | 2/2021 | Kobayashi | B60W 40/04 |

FOREIGN PATENT DOCUMENTS

| | | |
|---|---|---|
| JP | 2014-145447 A | 8/2014 |
| JP | 2015-063271 A | 4/2015 |
| JP | 2018-053539 A | 4/2018 |
| JP | 2019-065571 A | 4/2019 |

* cited by examiner

WORK VEHICLE

TECHNICAL FIELD

The present invention relates to a work vehicle equipped with a working device used in the work of excavating, carrying, and loading a work object such as earth and sand and minerals.

BACKGROUND ART

A work vehicle such as a wheel loader or a hydraulic excavator is equipped with a working device including an arm member rotationally movable in the vertical direction with respect to the vehicle body and a bucket rotationally movable in the vertical direction with respect to the arm member. When a hydraulic cylinder is supplied with a hydraulic oil, a rod extends or contracts, whereby the arm member and the bucket are driven, respectively. For example, in a state where the arm member is raised to the highest or the bucket is holding the load thereinto, when the rod extends or contracts to the limit and thus a piston reaches the stroke end, shock may occur.

In this respect, a hydraulic excavator disclosed in Patent Literature 1 is designed to, upon detecting that a piston of a hydraulic cylinder has approached the stroke end, reduce a discharge flow rate of a hydraulic pump and a rotational speed of an engine.

CITATION LIST

Patent Literature

Patent Literature 1: JP-A-H02-279841

SUMMARY OF INVENTION

Technical Problem

However, if applying the technique for the hydraulic excavator disclosed in Patent Literature 1 to a wheel loader, the rotational speed of the engine is limited, for example, even in the excavation work in which the bucket may rotationally move upward to the limit (full tilt state) with respect to the arm member or in the loading work in which the arm member may rotationally move upward to the limit with respect to the vehicle body. This may cause delay in the actual operations and thus reduction in the working efficiency.

Therefore, an object of the present invention is to provide a work vehicle capable of reducing the fuel consumption while maintaining the working efficiency even when a hydraulic cylinder reaches the stroke end.

Solution to Problem

In order to achieve the object described above, the present invention provides a work vehicle comprising: a vehicle body provided with a plurality of wheels; an engine mounted on the vehicle body; a torque converter for amplifying a torque transmitted from the engine; an accelerator pedal for adjusting a rotational speed of the engine; a brake pedal for adjusting a braking force applied to the plurality of wheels; a working device attached to the vehicle body; a hydraulic cylinder for driving the working device; a loading hydraulic pump driven by the engine and supplying a hydraulic oil to the hydraulic cylinder; and a controller configured to control the engine, wherein the controller is configured to: limit an upper limit rotational speed of the engine based on a step-on amount of the accelerator pedal, a step-on amount of the brake pedal, a torque converter speed ratio that is a ratio of a rotational speed of the torque converter, a discharge pressure of the loading hydraulic pump, and a stroke amount of the hydraulic cylinder.

Advantageous Effects of Invention

According to the present invention, it is possible to reduce the fuel consumption while maintaining the working efficiency even when a hydraulic cylinder reaches the stroke end. The problems, configurations, and advantageous effects other than those described above will be clarified by explanation of the embodiments below.

DESCRIPTION OF EMBODIMENTS

Hereinafter, as one of the aspects of work vehicles according to each embodiment of the present invention, a wheel loader that excavates a work object such as earth and sand and minerals and loads the excavated work object into a dump truck and the like will be described.

<Configuration of Wheel Loader 1>

Firstly, a configuration of a wheel loader 1 will be described with reference to FIG. 1.

Figure 1:
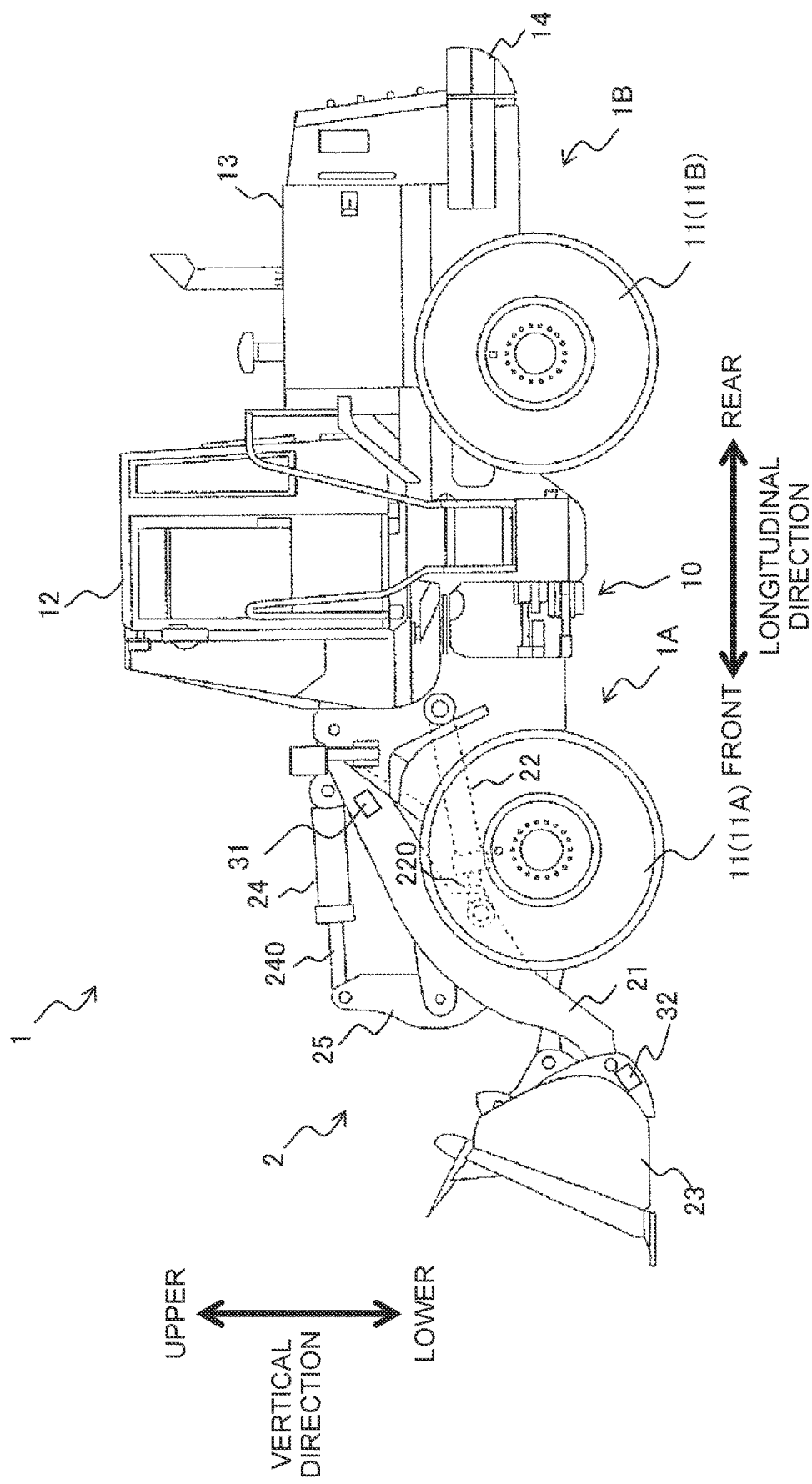
FIG. 1 is a side view of appearance illustrating a configuration example of a wheel loader according to each embodiment of the present invention.

FIG. 1 is a side view illustrating appearance of a configuration example of the wheel loader 1 according to each embodiment of the present invention.

The wheel loader 1 is an articulated type work vehicle which is swiveled on a central portion of a vehicle body and steered thereby. Specifically, a front frame 1A that is the front part of the vehicle body and a rear frame 1B that is the rear part of the vehicle body are connected to each other by a center joint 10 to swivel in the left and right direction so that the front frame 1A is bent in the left and right direction with respect to the rear frame 1B.

The vehicle body is provided with four wheels 11, namely, two of the wheels 11 are provided, as front wheels 11A, on the left and right sides of the front frame 1A, respectively, and the remaining two of the wheels 11 are provided, as rear wheels 11B, on the left and right sides of the rear frame 1B, respectively. FIG. 1 illustrates, among the pair of left and right front wheels 11A and the pair of left and right rear wheels 11B, only the front wheel 11A and the rear wheel 11B provided on the left side. In this connection, there are no limitation in the specific number of the wheels 11 to be provided on the vehicle body.

On a front portion of the front frame 1A, a hydraulically driven working device 2 used for the loading work is provided. The working device 2 for loading includes a lift arm 21 with the proximal end portion attached to the front frame 1A, two lift arm cylinders 22 for driving the lift arm 21, a bucket 23 attached to the distal end portion of the lift arm 21, a bucket cylinder 24 for driving the bucket 23, and a bell crank 25 rotatably coupled to the lift arm 21 and serving as a link mechanism between the bucket 23 and the bucket cylinder 24.

Each of the two lift arm cylinders 22 and the bucket cylinder 24 is one of the aspects of a hydraulic cylinder for driving the working device 2. Although the two lift arm cylinders 22 are arranged side by side in the lateral direction of the vehicle body, FIG. 1 illustrates only one of the lift arm cylinders 22 which is disposed on the left side by a broken line.

The proximal end portion of the lift arm 21 is attached to the front frame 1A, and when the two lift arm cylinders 22 are supplied with the hydraulic oil, the rods 220 expand or contract, respectively, whereby the lift arm 21 rotationally moves in the vertical direction with respect to the front frame 1A. More specifically, the lift arm 21 rotationally moves upward with respect to the front frame 1A in accordance with the extension of the rods 220 of the two lift arm cylinders 22, and rotationally moves downward with respect to the front frame 1A in accordance with the contraction of the rods 220.

An arm angle sensor 31 serving as an angle sensor for detecting an angle $\theta 1$ of the lift arm 21 with respect to the front frame 1A (hereinafter, simply referred to as an "arm angle $\theta 1$") is mounted on a portion of the lift arm 21 which is near the portion to which the front frame 1A is coupled. The arm angle $\theta 1$ detected by the arm angle sensor 31 is input to a vehicle body controller 5 which will be described later.

When the bucket cylinder 24 is supplied with the hydraulic oil, a rod 240 extends or contracts, whereby the bucket 23 rotationally moves in the vertical direction with respect to the lift arm 21. More specifically, the bucket 23 tilts (rotationally moves upward with respect to the lift arm 21) in accordance with the extension of the rod 240 of the bucket cylinder 24, and dumps (rotationally moves downward with respect to the lift arm 21) in accordance with the contraction of the rod 240.

Note that the bucket 23 can be replaced with various attachments such as a blade, and in addition to the excavation work using the bucket 23, the wheel loader 1 can perform various types of work such as dozing work, snow removing work, and the like.

A bucket angle sensor 32 serving as an angle sensor for detecting an angle $\theta 2$ of the bucket 23 with respect to the lift arm 21 (hereinafter, simply referred to as a "bucket angle $\theta 2$") is attached on a portion of the bucket 23 which is near the portion to which the lift arm 21 is coupled. As in the case of the arm angle $\theta 1$, the bucket angle $\theta 2$ detected by the bucket angle sensor 32 is input to the vehicle body controller 5 which will be described later.

The rear frame 1B includes an operator's cab 12 provided for an operator to get in, a machine room 13 for accommodating therein respective devices necessary for driving the wheel loader 1, and a counterweight 14 for balancing the vehicle body with the working device 2 to prevent the vehicle body from tilting. On the rear frame 1B, the operator's cab 12 is provided in the front thereof, the counterweight 14 is provided in the rear thereof, and the machine room 13 is provided between the operator's cab 12 and the counterweight 14.

<Operations of Wheel Loader 1 During Loading Work>

Next, the operations of the wheel loader 1 during the loading work will be described with reference to FIG. 2 to FIG. 4.

Figure 2:
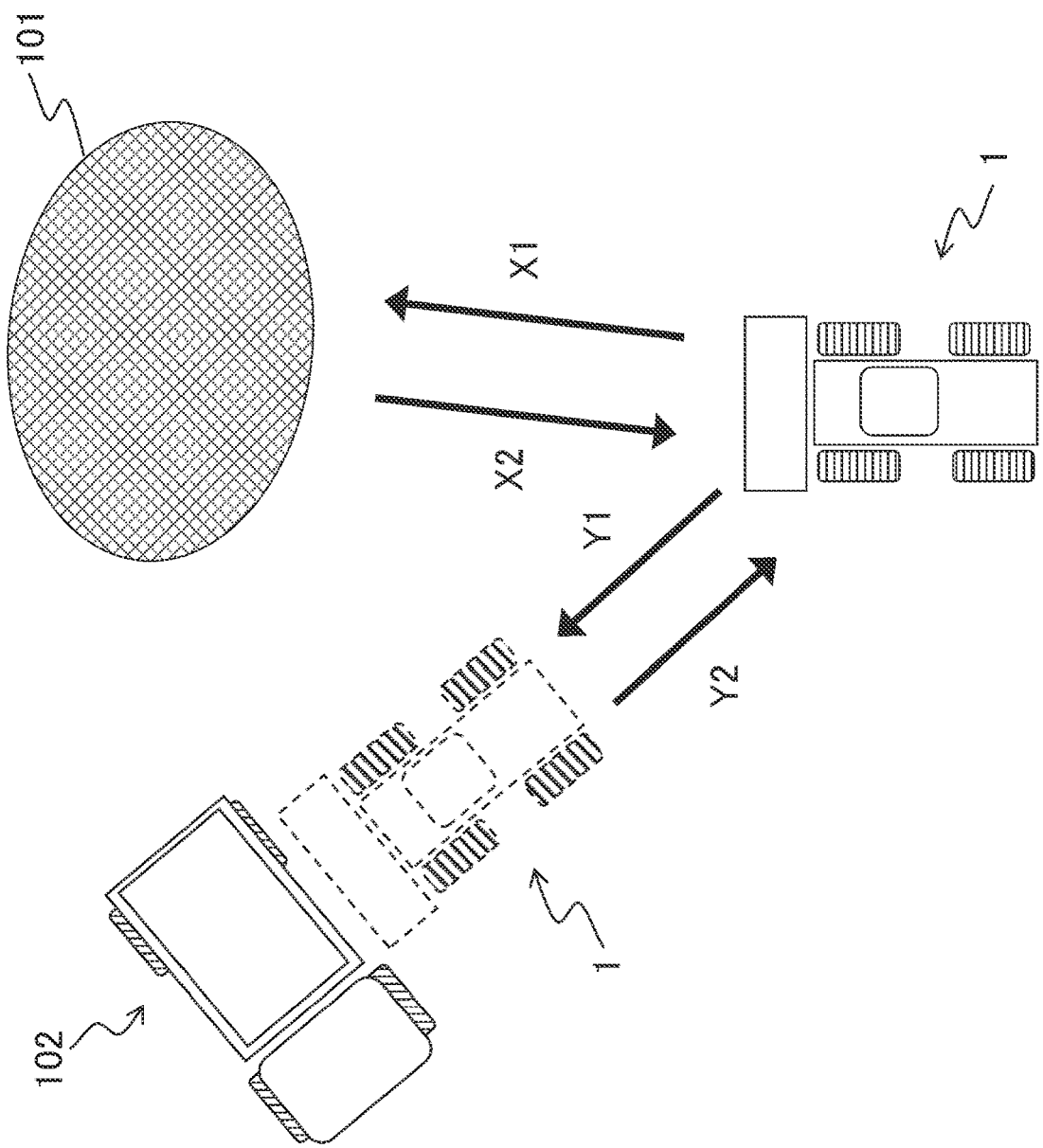
FIG. 2 is a diagram for explaining the V-shape loading performed by a wheel loader.
Figure 3A:
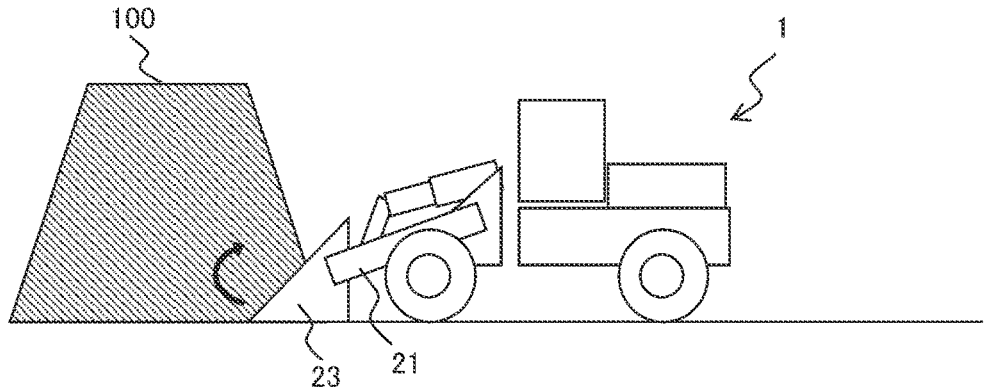
FIG. 3A is a diagram for explaining a scene in which a bucket has been made thrust into a pile during the excavation work performed by a wheel loader.
Figure 3B:
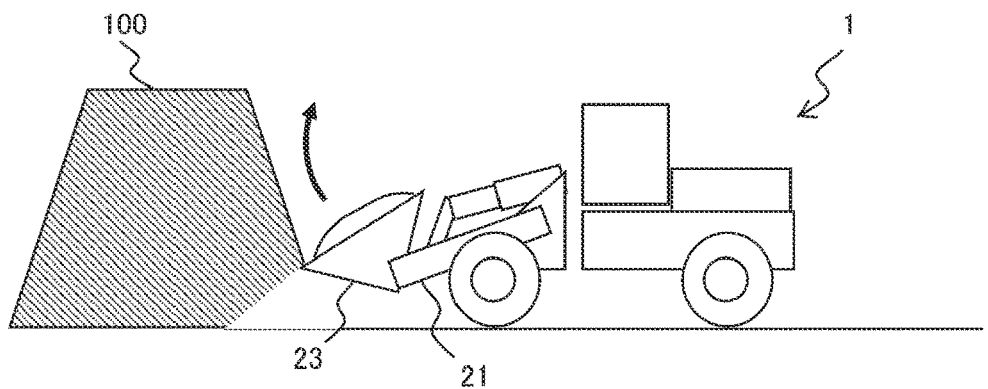
FIG. 3B is a diagram for explaining a scene in which a bucket has scooped up a load during the excavation work performed by a wheel loader.
Figure 3C:
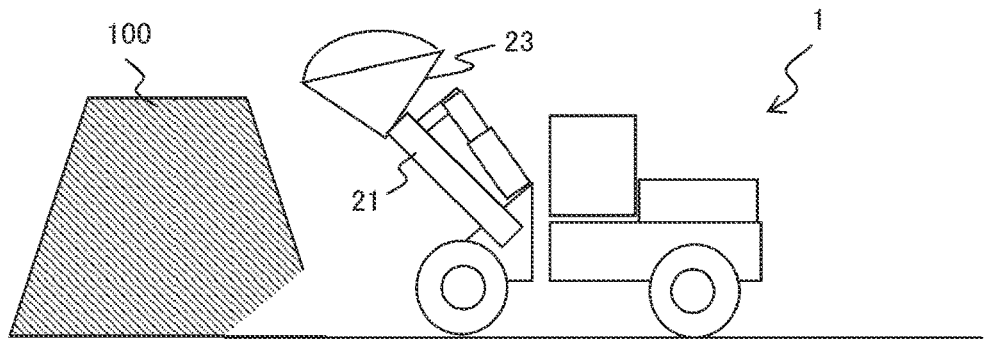
FIG. 3C is a diagram for explaining a scene in which a bucket with a load loaded therein has been raised upward during the excavation work performed by a wheel loader.

FIG. 2 is a diagram for explaining the V-shade loading performed by the wheel loader 1. FIG. 3A to FIG. 3C are diagrams for explaining the excavation work performed by the wheel loader, and more specifically, FIG. 3A illustrates a scene in which the bucket 23 has been made thrust into a pile 101, FIG. 3B illustrates a scene in which the bucket 23 has scooped up the load, and FIG. 3C illustrates a scene in which the bucket 23 with the load therein has been raised upward. FIG. 4 is a diagram for explaining the dump approach operation performed by the wheel loader 1.

Firstly, the wheel loader 1 travels forward toward the pile 101 to be excavated (arrow X1 illustrated in FIG. 2), and as illustrated in FIG. 3A, makes the bucket 23 thrust into the pile 101. Next, as illustrated in FIG. 3B, in accordance with an operator's manipulation for raising the lift arm 21 while making the bucket 23 tilt or for raising the lift arm 21 after making the bucket 23 tilt, the wheel loader 1 scoops up a load such as earth and sand and minerals. Then, as illustrated in FIG. 3C, in accordance with an operator's manipulation for raising the lift arm 21, the bucket 23 is further raised upward with the load being loaded therein.

The series of operations illustrated in FIG. 3A to FIG. 3C corresponds to the excavation work, and in the states illustrated in FIG. 3B and FIG. 3C, there are cases where the bucket 23 rotationally moves upward to the limit (full tilt state) with respect to the lift arm 21 so as to prevent the load being loaded therein from spilling off. In these cases, the rod 240 of the bucket cylinder 24 extends to the upper limit, and thus the stroke amount of the bucket cylinder 24 has reached a preset limit value. Upon completion of the excavation work, the wheel loader 1 moves rearward once to the original location (arrow X2 illustrated in FIG. 2)

Next, the wheel loader 1 moves forward toward a dump truck 102 which is a loading destination, and stops in front of the dump truck 102 to perform a dump approach operation (arrow Y1 illustrated in FIG. 2). Note that FIG. 2 illustrates the wheel loader 1 in a state of being stopped in front of the dump truck 102 by a broken line.

Figure 4:
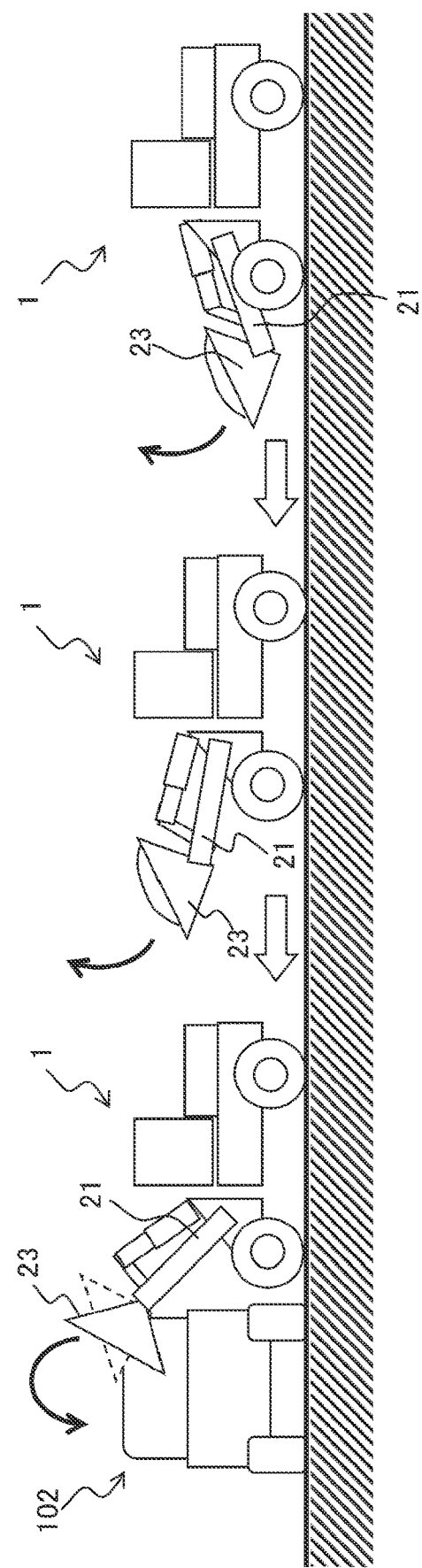
FIG. 4 is a diagram for explaining the dump approach operation performed by a wheel loader.

In the dump approach operation, as illustrated in FIG. 4, specifically, the operator steps on an accelerator pedal fully (full acceleration), and also performs the lifting operation to raise the lift arm 21 (state illustrated on the right side of FIG. 4). Next, the operator adjusts the vehicle speed by stepping on a brake pedal a little at the same time while further raising the lift arm 21 with maintaining the full acceleration state, so as to prevent the vehicle body from colliding with the dump truck 102 (state illustrated in the center of FIG. 4). Then, the operator further steps on the brake pedal to stop the vehicle body in front of the dump truck 102, and makes the bucket 23 dump to discharge the load in the bucket 23 into the dump truck 102 (state illustrated on the left side of FIG. 4).

In the state illustrated in FIG. 4, depending on the height of a vessel of the dump truck 102, the lift arm 21 may rotationally move upward to the limit with respect to the front frame 1A. In this case, the rods 220 of the two lift arm cylinders 22 extend to the upper limit, respectively, and thus the stroke amounts of the two lift arm cylinders 22 have reached preset limit values. Similarly, in the case of the dumping operation of the bucket 23, the bucket 23 may rotatably move downward to the limit (full dump state) with respect to the lift arm 21. In this case, the rod 240 of the bucket cylinder 24 contracts to the lower limit, and thus the stroke amount of the bucket cylinder 24 has reached a preset limit value.

Upon completion of the work of loading the load into the dump truck 102, the wheel loader 1 moves rearward to the original location (arrow Y2 illustrated in FIG. 2). In this way, the wheel loader 1 performs the excavation work and the loading work by a method called "V-Shape loading" in which the wheel loader 1 reciprocates in a V-shape between the pile 101 and the dump truck 102.

First Embodiment

Hereinafter, a drive system of the wheel loader 1 according to the first embodiment of the present invention will be described with reference to FIG. 5 to FIG. 9.
(Overall Configuration of Drive System)

Firstly, the overall configuration of the drive system of the wheel loader 1 according to the first embodiment will be described with reference to FIG. 5.

Figure 5:
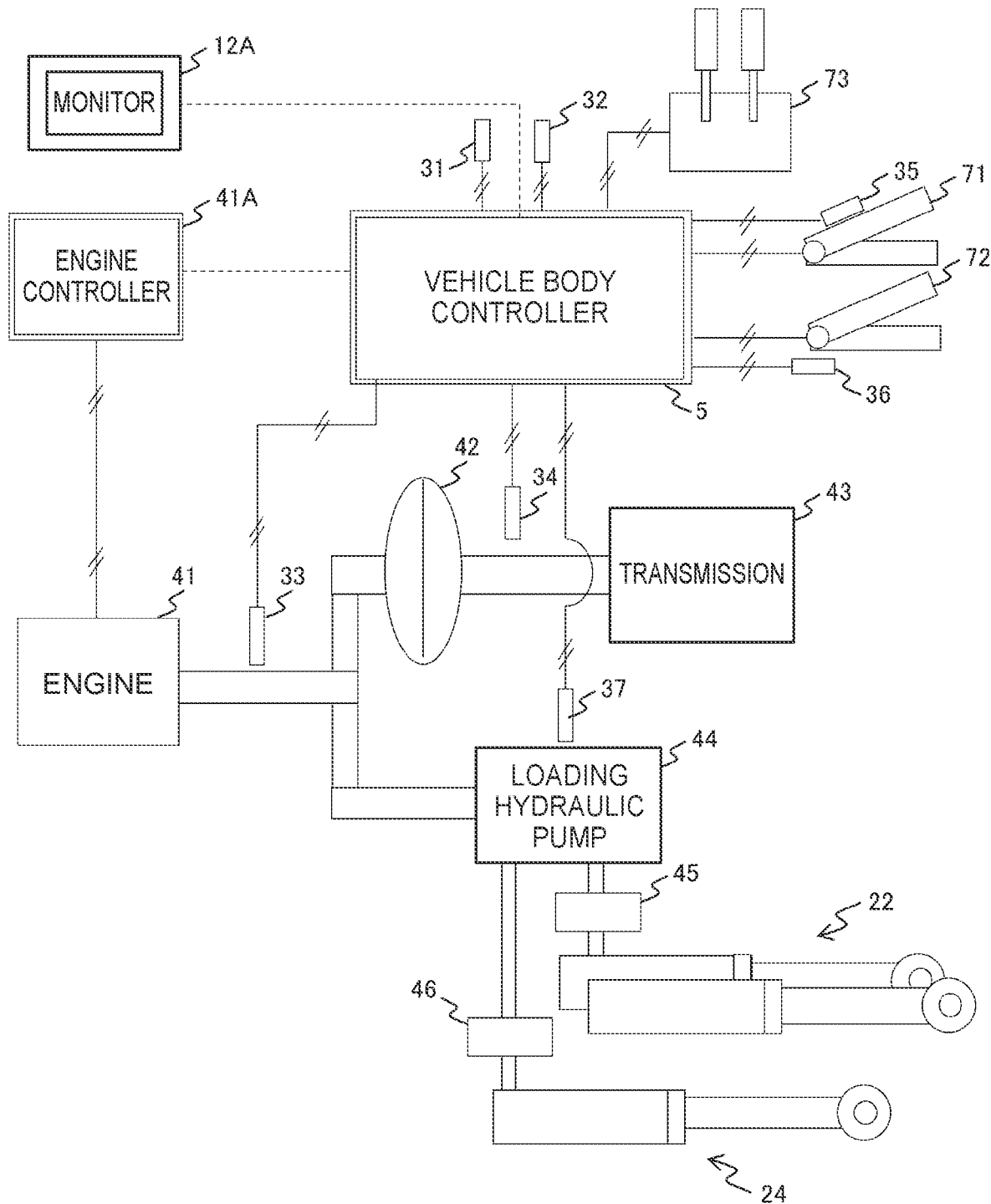
FIG. 5 illustrates a drive system of a wheel loader according to a first embodiment of the present invention.

FIG. 5 illustrates a drive system configuration of the wheel loader 1 according to the first embodiment.

In the wheel loader 1 according to the present embodiment, the traveling of the vehicle body is controlled by a torque converter traveling drive system. The torque converter traveling drive system includes an engine 41, an engine controller 41A for controlling the engine 41, a torque converter 42 coupled to an output shaft of the engine 41, a transmission 43 coupled to an output shaft of the torque converter 42, and a vehicle body controller 5 for controlling each of the devices including the engine controller 41A, the torque converter 42, and the transmission 43.

The engine controller 41A is connected to the vehicle body controller 5 via a CAN, and controls the engine 41 based on a signal output from the vehicle body controller 5. Note that the engine controller 41A and the vehicle body controller 5 are not necessarily provided separately, but one controller including the engine controller 41A and the vehicle body controller 5 may be provided.

The torque converter 42 is a fluid clutch including an impeller, a turbine, and a stator, and has a function to amplify an output torque with respect to an input torque (torque transmitted from the engine 41), that is, a function to make a torque ratio (=output torque/input torque) 1 or more.

The torque ratio decreases as a ratio of a rotational speed NE of the engine 41 (hereinafter, referred to as an "engine rotational speed NE"), which is also the rotational speed of an input shaft of the torque converter 42, to a rotational speed NT of the output shaft of the torque converter 42 (hereinafter, referred to as a "torque converter output rotational speed NT"), that is, a torque converter speed ratio e which is a ratio of the rotational speed of the torque converter 42 (=rotational speed NT of the output shaft/ rotational speed NE of the input shaft) increases. Thus, the torque converter 42 changes the rotational speed of the engine 41, and then transmits it to the transmission 43.

The engine rotational speed NE is detected by a first rotational speed sensor 33 provided on the output shaft of the engine 41, and the torque converter output rotational speed NT is detected by a second rotational speed sensor 34 provided on the output shaft of the torque converter 42, respectively, and are input to the vehicle body controller 5.

The transmission 43 includes a clutch mechanism having a plurality of clutches and a gear mechanism having a plurality of transmission gears, and switches the traveling direction and speed stage of the vehicle body. That is, the transmission 43 changes the torque and rotational speed of the output shaft of the torque converter 42, and then transmits them to the four wheels 11.

In the torque converter traveling drive system, firstly, when the operator steps on an accelerator pedal 71 provided in the operator's cab 12, the engine 41 rotates based on a step-on amount thereof, and then the input shaft of the torque converter 42 coupled to the output shaft of the engine 41 rotates in accordance with the rotation of the engine 41. That is, operating the accelerator pedal 71 enables adjustment of the engine rotational speed NE.

A step-on amount $\alpha$ of the accelerator pedal 71 (hereinafter, referred to as an "accelerator pedal step-on amount $\alpha$") is proportional to the engine rotational speed NE, and the engine rotational speed NE increases as the accelerator pedal step-on amount $\alpha$ increases. Note that the accelerator pedal step-on amount $\alpha$ is detected, as a pedal opening degree, by a first step-on amount sensor 35 mounted on the accelerator pedal 71, and then input to the vehicle body controller 5.

When the input shaft of the torque converter 42 rotates, the output shaft of the torque converter 42 rotates via the oil inside the torque converter 42. The transmission 43 changes the output torque from the torque converter 42 and then transmits it to the four wheels 11, respectively, whereby the wheel loader 1 can travel.

In order to stop or decelerate the wheel loader 1, the operator steps on a brake pedal 72 provided in the operator's cab 12. The clutch mechanism of the transmission 43 is controlled based on a step-on amount $\beta$, of the brake pedal 72 (hereinafter, referred to as a "brake pedal step-on amount $\beta$") to interrupt the transmission of the driving force to the four wheels 11. That is, operating the brake pedal 72 enables adjustment of the braking force applied to the four wheels 11. The brake pedal step-on amount $\beta$, is detected, as a brake secondary pressure, by a second step-on amount sensor 36, and then input to the vehicle body controller 5.

Furthermore, the wheel loader 1 is provided with, in addition to the traveling drive system of the vehicle body, a loading drive system for driving the working device 2. The loading drive system includes a loading hydraulic pump 44 driven by the engine 41 to supply the hydraulic oil to the two lift arm cylinders 22 and the bucket cylinder 24, respectively, a first directional control valve 45 provided between the loading hydraulic pump 44 and the two lift arm cylinders 22, and a second directional control valve 46 provided between the loading hydraulic pump 44 and the bucket cylinder 24.

The first directional control valve 45 controls the flow (flow rate and direction) of the hydraulic oil discharged from the loading hydraulic pump 44 and supplied to the two lift arm cylinders 22. Similarly, the second directional control valve 46 controls the flow of the hydraulic oil discharged from the loading hydraulic pump 44 and supplied to the bucket cylinder 24. A discharge pressure P1 of the loading hydraulic pump 44 (hereinafter, referred to as a unit "discharge pressure P1") is detected by a discharge pressure sensor 37, and then input to the vehicle body controller 5.

The first directional control valve 45 and the second directional control valve 46 are controlled based on command signals output from the vehicle body controller 5, respectively. In the operator's cab 12, an operation device 73 for operating the working device 2 (lift arm 21 and bucket 23) is provided, and an operation signal corresponding to an operation amount of the operation device 73 is input to the vehicle body controller 5. Then, the vehicle body controller 5 outputs a command signal based on the operation signal output from the operation device 73.

Furthermore, in the present embodiment, the operator's cab 12 is provided with a monitor 12A. The monitor 12A displays, based on a display signal (notification signal) output from the vehicle body controller 5, states of the devices such as a state of the engine 41, which are necessary for the wheel loader 1 to perform the operations.

(Configuration of Vehicle Body Controller 5)

Next, a configuration of the vehicle body controller 5 will be described with reference to FIG. 6.

Figure 6:
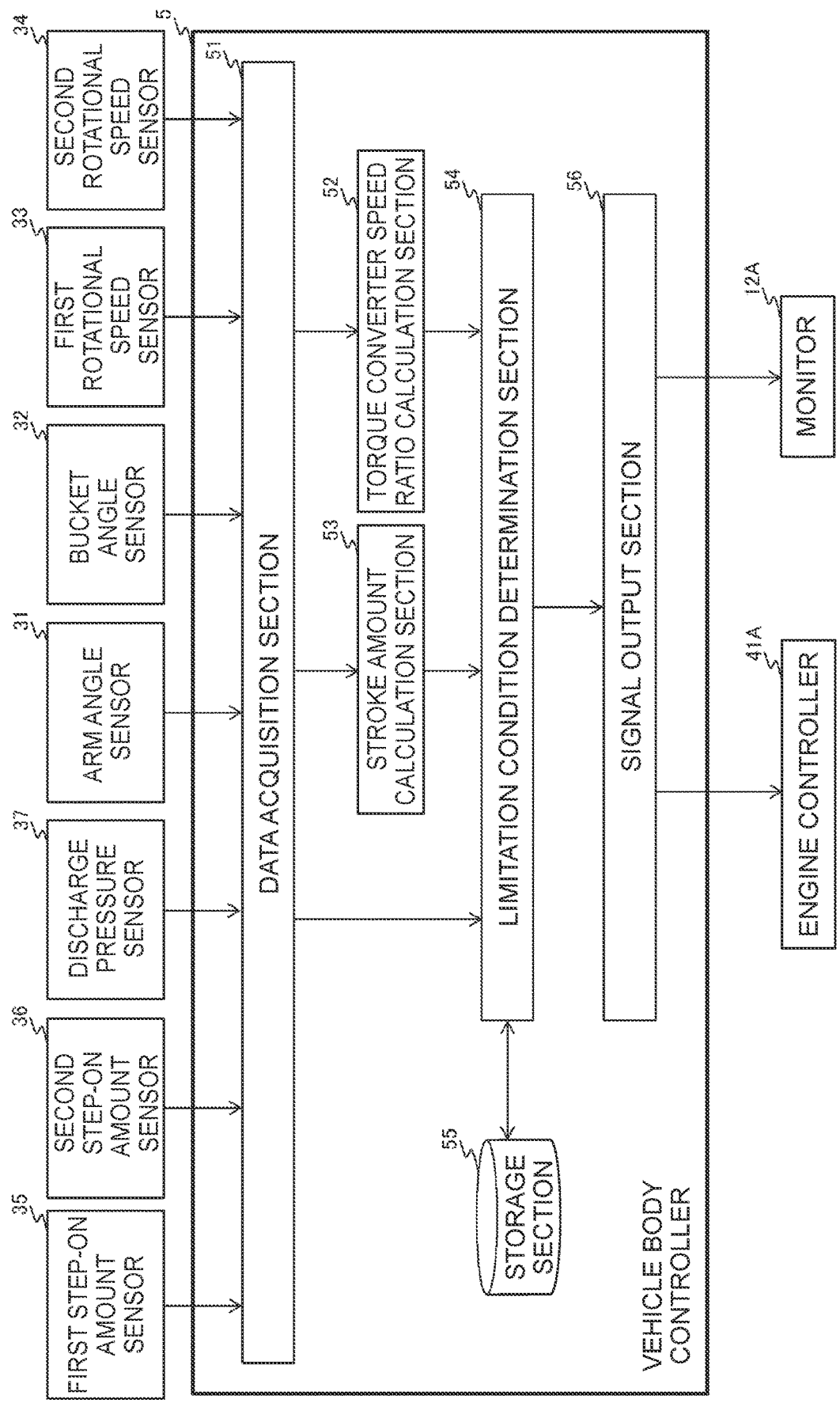
FIG. 6 is a functional block diagram illustrating functions of a vehicle body controller according to the first embodiment.

FIG. 6 is a functional block diagram illustrating functions of the vehicle body controller 5.

The vehicle body controller 5 is configured such that a CPU, a RAM, a ROM, an HDD, an input I/F, and an output I/F are connected to each other via a bus. Various sensors such as the arm angle sensor 31, the bucket angle sensor 32, the first rotational speed sensor 33, the second rotational speed sensor 34, the first step-on amount sensor 35, and the second step-on amount sensor 36 are connected to the input I/F, the engine controller 41A and the monitor 12A, etc. are connected to the output I/F.

In this hardware configuration, the CPU reads out a control program (software) stored in a recording medium such as the ROM, the HDD or an optical disc, and loads and executes the control program on the RAM, whereby the control program and the hardware collaborate to implement the functions of the controller 5.

In the present embodiment, the controller 5 is described as a computer configured by a combination of software and hardware. However, the controller 5 is not limited thereto, and as one of the examples of configurations of other computers, an integrated circuit for implementing the functions of the control program executed on the side of the wheel loader 1 may be used.

The vehicle body controller 5 includes a data acquisition section 51, a torque converter speed ratio calculation section 52, a stroke amount calculation section 53, a limitation condition determination section 54, a storage section 55, and a signal output section 56.

The data acquisition section 51 is configured to acquire data relating to the accelerator pedal step-on amount $\alpha$ detected by the first step-on amount sensor 35, the brake pedal step-on amount $\beta$, detected by the second step-on amount sensor 36, the engine rotational speed NE detected by the first rotational speed sensor 33, the torque converter output rotational speed NT detected by the second rotational speed sensor 34, the discharge pressure P1 detected by the discharge pressure sensor 37, the arm angle $\theta 1$ detected by the arm angle sensor 31, and the bucket angle $\theta 2$ detected by the bucket angle sensor 32, respectively.

The torque converter speed ratio calculation section 52 is configured to calculate the torque converter speed ratio e (=NT/NE) based on the engine rotational speed NE and the torque converter output rotational speed NT acquired by the data acquisition section 51. The stroke amount calculation section 53 is configured to calculate a stroke amount S1 of the lift arm cylinders 22 (hereinafter, referred to as an "arm stroke amount S1") based on the arm angle $\theta 1$ acquired by the data acquisition section 51, and a stroke amount S2 of the bucket cylinder 24 (hereinafter, a "bucket stroke amount S2") based on the bucket angle $\theta 2$ acquired by the data acquisition section 51, respectively.

In the present embodiment, the vehicle body controller 5 calculates the arm stroke amount S1 based on the detected arm angle $\theta 1$ and the bucket stroke amount S2 based on the detected bucket angle $\theta 2$. However, the present embodiment is not limited thereto, but for example, a stroke sensor and the like which is capable of measuring a stroke amount of a hydraulic cylinder can be used to detect the stroke amount directly. In the case of using a stroke sensor and the like, it is necessary to separately attach new sensors to the lift arm cylinders 22 and the bucket cylinder 24, on the other hand, using the existing arm angle sensor 31 and bucket angle sensor 32 enables reduction in the cost.

The limitation condition determination section 54 is configured to determine whether a first limitation condition and a second limitation condition are satisfied. The "first limitation condition" is a condition relating to the stall of the engine 41, and includes that the accelerator pedal step-on amount $\alpha$ is equal to or more than a first step-on amount threshold value $\alpha$th ($\alpha \geq \alpha$th) and the brake pedal step-on amount $\beta$, is equal to or more than a second step-on amount threshold value $\beta$th ($\beta \geq \beta$th), and in the present embodiment, further includes that the torque converter speed ratio e is equal to or less than a speed ratio threshold value eth (e≤eth).

Including that the torque converter speed ratio e is equal to or less than the speed ratio threshold value eth (e≤eth) in the first limitation condition enables the limitation condition determination section 54 (vehicle body controller 5) to accurately determine a stall state of the engine 41.

The first step-on amount threshold value $\alpha$th corresponds to a first threshold value set based on an upper limit value of the accelerator pedal step-on amount, and is set to, for example, a value of about 90% of the upper limit value. The second step-on amount threshold value $\beta$th corresponds to a second threshold value set based on an upper limit value of the brake pedal step-on amount, for example, is set to a value of about 90% of the upper limit value. The speed ratio threshold value eth corresponds to a third threshold value set based on a torque speed ratio at the time when the engine 41 stalls, and is set to, for example, a value of about 0.2.

That is, when the first limitation condition is satisfied, the wheel loader 1 is in a state where, at least, it decelerates to the speed close to the speed at which it stops, and also revs up the engine 41 at the rotational speed close to the upper limit rotational speed (idling state).

The "second limitation condition" is a condition relating to the relief of the loading hydraulic pump 44 and the stroke end of the lift arm cylinders 22 or bucket cylinder 24, and includes that the discharge pressure P1 is equal to or more than a discharge pressure threshold value P1th (P1≥P1th), and the arm stroke amount S1 is equal to or more than a first stroke amount threshold value S1th (S1≥S1th) or the bucket stroke amount S2 is equal to or more than a second stroke amount threshold value S2th (S2≥S2th).

The discharge pressure threshold value P1th corresponds to a fourth threshold value set based on a main relief pressure of a drive circuit for driving the working device 2, and is set to, for example, about 90% of the main relief pressure. The first stroke amount threshold value S1th and the second stroke amount threshold value S2th correspond to fifth threshold values set based on limit values of each stroke amount, and are set to, for example, about 90% of the limit values of each stroke amount.

That is, when the second limitation condition is satisfied, the wheel loader 1 is in a state where at least either the rods 220 of the two lift arm cylinders 22 or the rod 240 of the bucket cylinder 24 extends or contracts to a position close to the stroke end, and also the hydraulic oil discharged from the loading hydraulic pump 44 is likely to be relieved.

The storage section 55 is a memory, and retains the first step-on amount threshold value αth, the second step-on amount threshold value βth, the speed ratio threshold value eth, the discharge pressure threshold value P1th, the first stroke amount threshold value S1th, and the second stroke amount threshold value S2th.

When the limitation condition determination section 54 determines that the first limitation condition and the second limitation condition are satisfied, the signal output section 56 outputs a limitation signal for limiting an upper limit rotational speed of the engine 41 to the engine controller 41A. Note that the upper limit rotational speed of the engine 41 may be the maximum rotational speed of the engine 41, or the rotational speed which has been arbitrarily set.

In the present embodiment, when the limitation condition determination section 54 determines that the first limitation condition and the second limitation condition are satisfied, the signal output section 56 outputs, to the monitor 12A, a display signal relating to a notification that the upper limit rotational speed of the engine 41 is being limited. The monitor 12A is one of the aspects of a notification device for notifying that the upper limit rotational speed of the engine 41 is being limited. Note that the notification device is not necessarily a display device such as the monitor 12A, and may be, for example, an audio device.

(Processing in Vehicle Body Controller 5)

Next, a specific flow of processing executed in the vehicle body controller 5 will be described with reference to FIG. 7. The advantageous operations and effects obtained by execution of this processing in the vehicle body controller 5 will be described with reference to FIG. 8 and FIG. 9.

Figure 7:
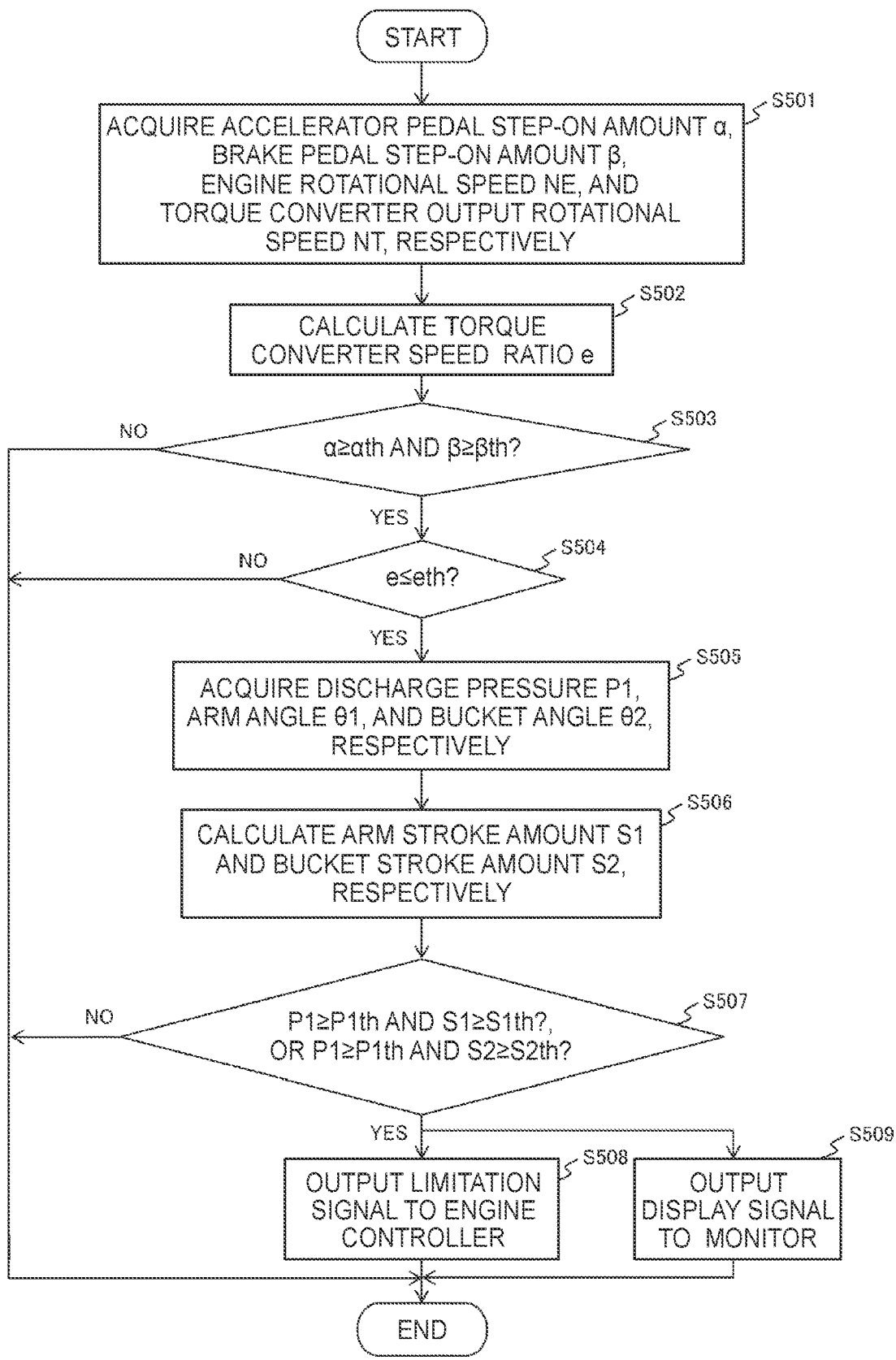
FIG. 7 is a flowchart illustrating a flow of processing executed by the vehicle body controller according to the first embodiment.
Figure 8:
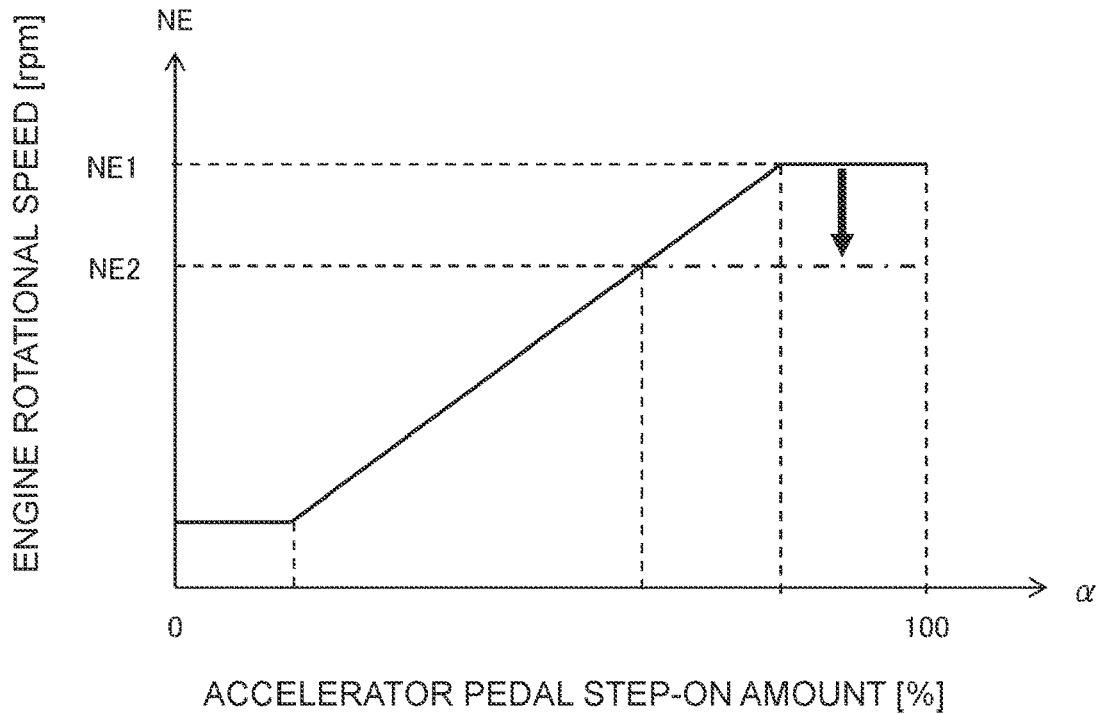
FIG. 8 illustrates a graph showing the relation between an accelerator pedal step-on amount and an engine rotational speed.
Figure 9:
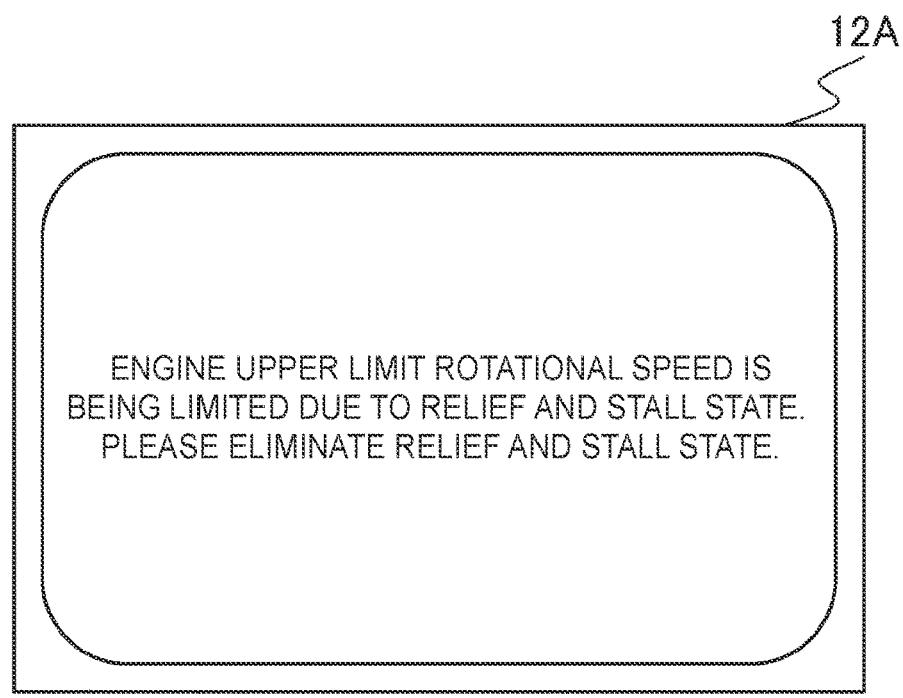
FIG. 9 illustrates an example of a notification displayed on a monitor.

FIG. 7 is a flowchart illustrating a flow of the processing executed by the vehicle body controller 5. FIG. 8 illustrates a graph showing the relation between the accelerator pedal step-on amount α and the engine rotational speed NE. FIG. 9 illustrates an example of the notification displayed on the monitor 12A.

Firstly, the data acquisition section 51 acquires the accelerator pedal step-on amount α detected by the first step-on amount sensor 35, the brake pedal step-on amount β, detected by the second step-on amount sensor 36, the engine rotational speed NE detected by the first rotational speed sensor 33, and the torque converter output rotational speed NT detected by the second rotational speed sensor 34, respectively (step S501).

Next, the torque converter speed ratio calculation section 52 calculates the torque converter speed ratio e (=NT/NE) based on the engine rotational speed NE and the torque converter output rotational speed NT acquired in step S501 (step S502).

Next, the limitation condition determination section 54 determines whether the accelerator pedal step-on amount α acquired in step S501 is equal to or more than the first step-on amount threshold value αth and the brake pedal step-on amount β is equal to or more than the second step-on amount threshold value βth (step S503).

In step S503, when determining that the accelerator pedal step-on amount α is equal to or more than the first step-on amount threshold value αth and the brake pedal step-on amount β is equal to or more than the second step-on amount threshold value βth (α≥αth and β≥βth) (step S503/YES), the limitation condition determination section 54 subsequently determines whether the torque converter speed ratio e calculated in step S502 is equal to or less than the speed ratio threshold value eth (step S504).

In step S504, when it is determined that the torque converter speed ratio e is equal to or less than the speed ratio threshold value eth (e≤eth) (step S504/YES), the data acquisition section 51 acquires the discharge pressure P1 detected by the discharge pressure sensor 37, the arm angle θ1 detected by the arm angle sensor 31, and the bucket angle θ2 detected by the bucket angle sensor 32, respectively (step S505).

Next, the stroke amount calculation section 53 calculates the arm stroke amount S1 based on the arm angle θ1 acquired in step S505 and the bucket stroke amount S2 based on the bucket angle θ2 acquired in step S505, respectively (step S506).

Next, the limitation condition determination section 54 determines whether the discharge pressure P1 acquired in step S505 is equal to or more than the discharge pressure threshold value P1th, and the arm stroke amount S1 calculated in step S506 is equal to or more than the first stroke amount threshold value S1th or the bucket stroke amount S2 is equal to or more than the second stroke amount threshold value S2th (step S507).

In step S507, when it is determined that the discharge pressure P1 is equal to or more than the discharge pressure threshold value P1th, and the arm stroke amount S1 is equal to or more than the first stroke amount threshold value S1th or the bucket stroke amount S2 is equal to or more than the second stroke amount threshold value S2th (P1≥P1th and S1≥S1th, or P1≥P1th and S2≥S2th) (step S507/YES), the signal output section 56 outputs a limitation signal to the engine controller 41A (step S508) and also outputs a display signal to the monitor 12A (step S509). Then, the processing in the vehicle body controller 5 is ended.

When it is determined in step S503 that the accelerator pedal step-on amount α is less than the first step-on amount threshold value αth or the brake pedal step-on amount β is less than the second step-on amount threshold value βth (α<αth or β<βth) (step S503/NO), when it is determined in step S504 that the torque converter speed ratio e is more than the speed ratio threshold value eth (e>eth) (step S504/YES), or when it is determined in step S507 that the discharge pressure P1 is not equal to or more than the discharge pressure threshold value P1th or even if the discharge pressure P1 is equal to or more than the discharge pressure threshold value P1th, the arm stroke amount S1 is less than the first stroke amount threshold value S1th and the bucket stroke amount S2 is less than the second stroke amount threshold value S2th (P1<P1th, or P1≥P1th, S1<S1th, and S2<S2th), the processing in the vehicle body controller 5 is ended (step S507/NO).

Thus, when the first limitation condition (at least in step S503) and the second limitation condition (step S507) are satisfied, as illustrated in FIG. 8, the vehicle body controller 5 limits the upper limit rotational speed of the engine 41 from NE1 to NE2 (indicated by a chain line in FIG. 8), whereby it is possible to eliminate the stall condition of the engine 41 and thus reduce the fuel consumption. In this case, in the working device 2, since at least either the lift arm cylinders 22 or the bucket cylinder 24 is nearly in a stroke end state, and also the hydraulic oil of the loading hydraulic pump 44 is on the verge of the relief, limiting the upper limit rotational speed of the engine 41 does not interfere with the work. This enables the wheel loader 1 to reduce the fuel consumption while maintaining the working efficiency.

Furthermore, in the present embodiment, as illustrated in FIG. 9, while the vehicle body controller 5 is limiting the upper limit rotational speed of the engine 41, the monitor 12A displays to that effect, thereby making it possible to alert the operator.

Second Embodiment

Next, a drive system of the wheel loader 1 according to a second embodiment of the present invention will be described with reference to FIG. 10 to FIG. 13. In FIG. 10 to FIG. 13, the components common to those described for the wheel loader 1 according to the first embodiment are provided with the same reference signs, and explanation thereof is omitted.

(Overall Configuration of Drive System)

Firstly, the overall configuration of the drive system of the wheel loader 1 according to the second embodiment will be described with reference to FIG. 10 and FIG. 11.

Figure 10:
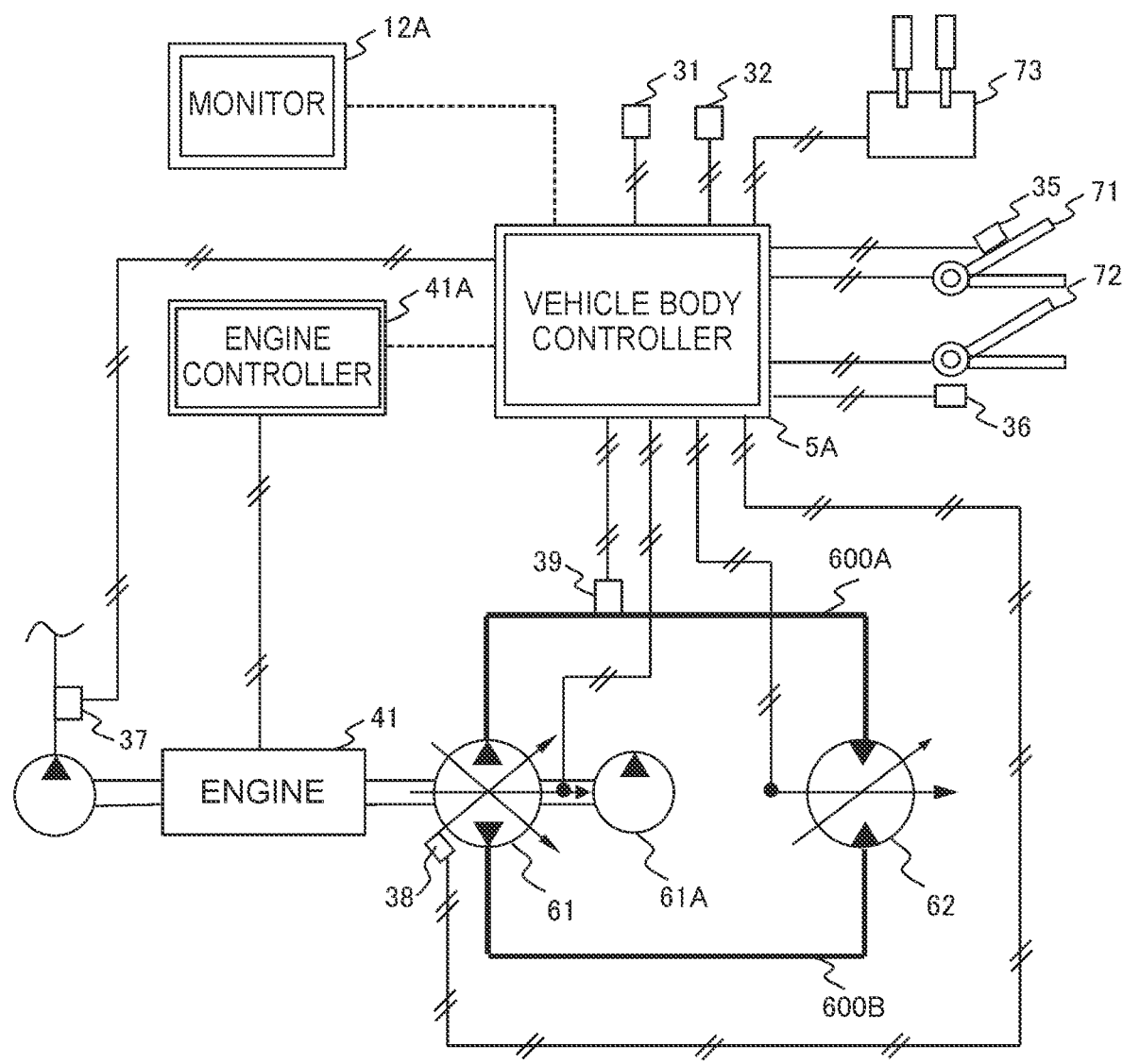
FIG. 10 illustrates a drive system of a wheel loader according to a second embodiment of the present invention.

FIG. 10 illustrates a configuration of the drive system of the wheel loader 1 according to the second embodiment of the present invention. FIG. 11 illustrates graphs each of which shows the relation between the engine 41 and the HST pump 61.

In the wheel loader 1 according to the present embodiment, the traveling of the vehicle body is controlled by an HST traveling drive system which enables the wheel loader 1 to startup smoothly and stop without experiencing shocks. The HST traveling drive system includes, as illustrated in FIG. 10, an HST pump 61 serving as a traveling hydraulic pump driven by the engine 41, an HST charge pump 61A for replenishing a pressure oil for controlling the HST pump 61, an HST motor 62 serving as a traveling hydraulic motor connected to the HST pump 61 via a pair of pipes 600A, 600B by a closed-circuit.

The HST pump 61 is a swash plate type variable displacement hydraulic pump in which the displacement volume is controlled in accordance with a tilting angle (tilting amount). The tilting angle is adjusted by a pump regulator in accordance with a command signal output from the vehicle body controller 5A. A tilting angle $\theta 3$ of the HST pump 61 (hereinafter, simply referred to as a "tilting angle $\theta 3$") is detected by a tilting angle sensor 38, and then input to the vehicle body controller 5A.

The HST motor 62 is a swash plate type variable displacement hydraulic motor in which the displacement volume is controlled in accordance with a tilting angle (tilting amount), and transmits the driving force of the engine 3 to the four wheels 11. As in the case of the HST pump 61, the tilting angle is adjusted by a motor regulator in accordance with a command signal output from the vehicle body controller 5A. Note that a load pressure P2 of the HST motor 62 (hereinafter, simply referred to as a "load pressure P2") is detected by a pressure sensor 39 provided on the pipe 600A which is one of the pipes 600A, 600B, and then input to the vehicle body controller 5A.

In the HST traveling drive system, firstly, when the operator steps on the accelerator pedal 71, the engine 41 rotates, and the HST pump 61 is driven by the driving force of the engine 41. Next, the pressure oil discharged from the HST pump 61 flows into the HST motor 62, thereby rotating the HST motor 62. Then, the output torque from the HST motor 62 is transmitted to the four wheels 11 via an axle, whereby the vehicle body can travel.

Figure 11:
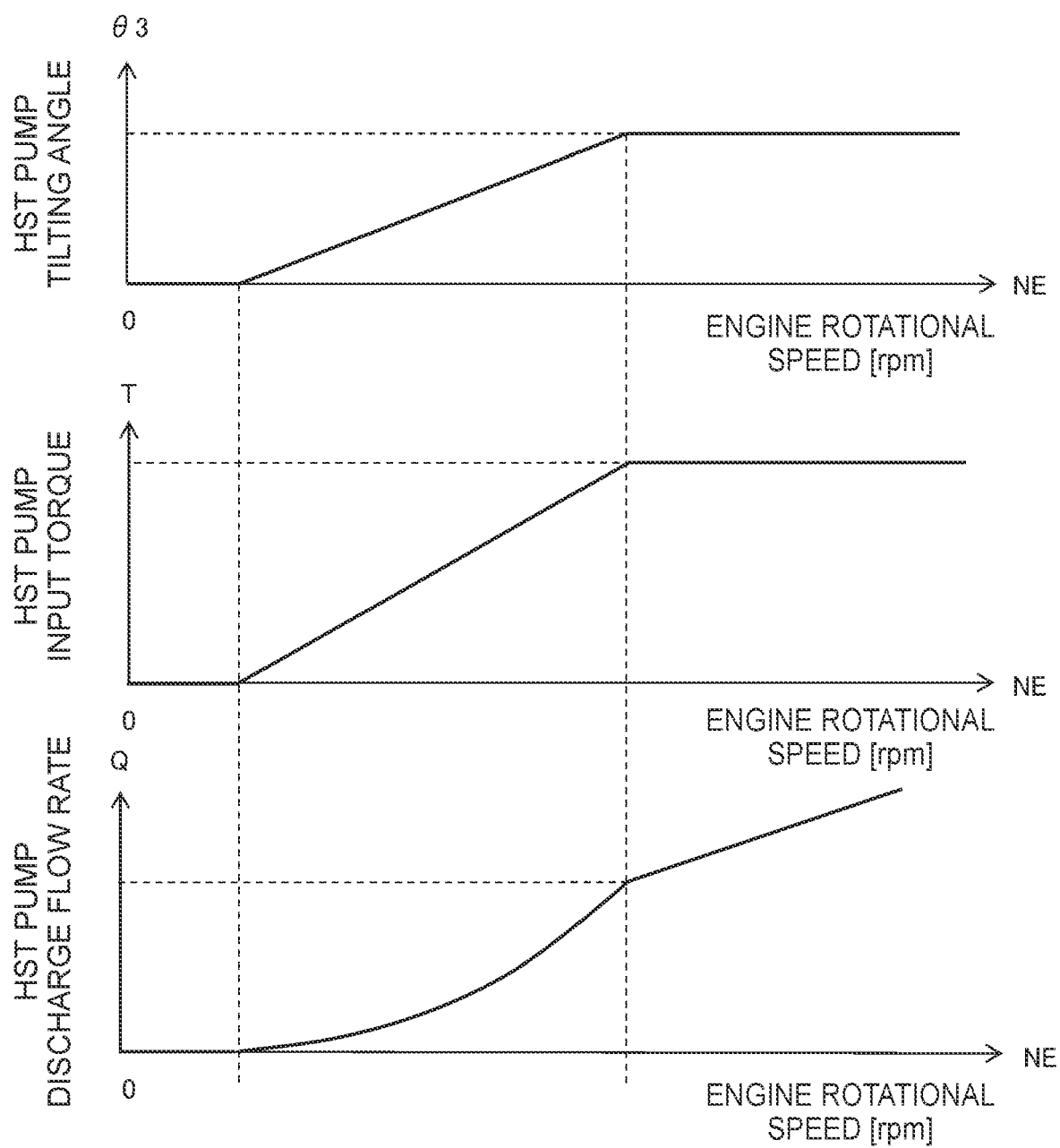
FIG. 11 illustrates graphs each of which shows the relation between an engine and an HST pump.

As illustrated in the graph on the uppermost part and the graph on the middle part of FIG. 11, as the accelerator pedal step-on amount $\alpha$ increases and thus the engine rotational speed NE increases, the tilting angle $\theta 3$ and input torque T of the HST pump 61 also increase proportionally. Accordingly, a discharge flow rate Q of the HST pump 61 increases, thereby increasing the flow rate of the pressure oil flowing from the HST pump 61 into the HST motor 62. In this way, the rotational speed of the HST motor 62 increases, and thus the vehicle speed increases.

(Configuration of Vehicle Body Controller 5A)

Next, a configuration of the vehicle body controller 5A will be described with reference to FIG. 12 and FIG. 13.

Figure 12:
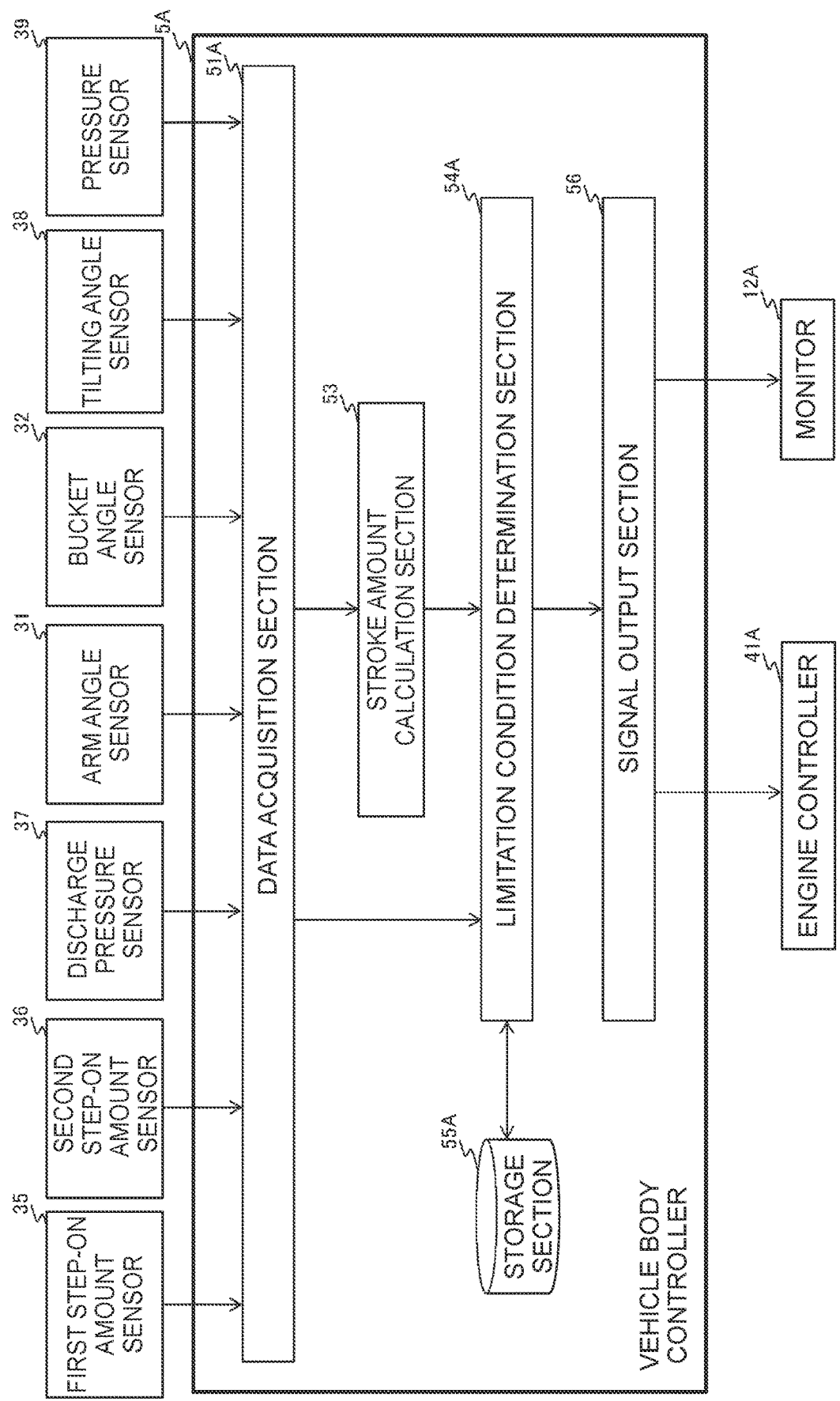
FIG. 12 is a functional block diagram illustrating functions of a vehicle body controller according to the second embodiment.

FIG. 12 is a functional block diagram illustrating functions of the vehicle body controller 5A according to the second embodiment. FIG. 13 is a flowchart illustrating a flow of processing executed by the vehicle body controller 5A according to the second embodiment.

As illustrated in FIG. 12, the vehicle body controller 5A according to the present embodiment includes a data acquisition section 51A, a stroke amount calculation section 53, a limitation condition determination section 54A, a storage section 55A, and the signal output section 56. That is, the vehicle body controller 5A according to the present embodiment does not include the torque converter speed ratio calculation section 52 which is included in the vehicle body controller 5 according to the first embodiment.

Figure 13:
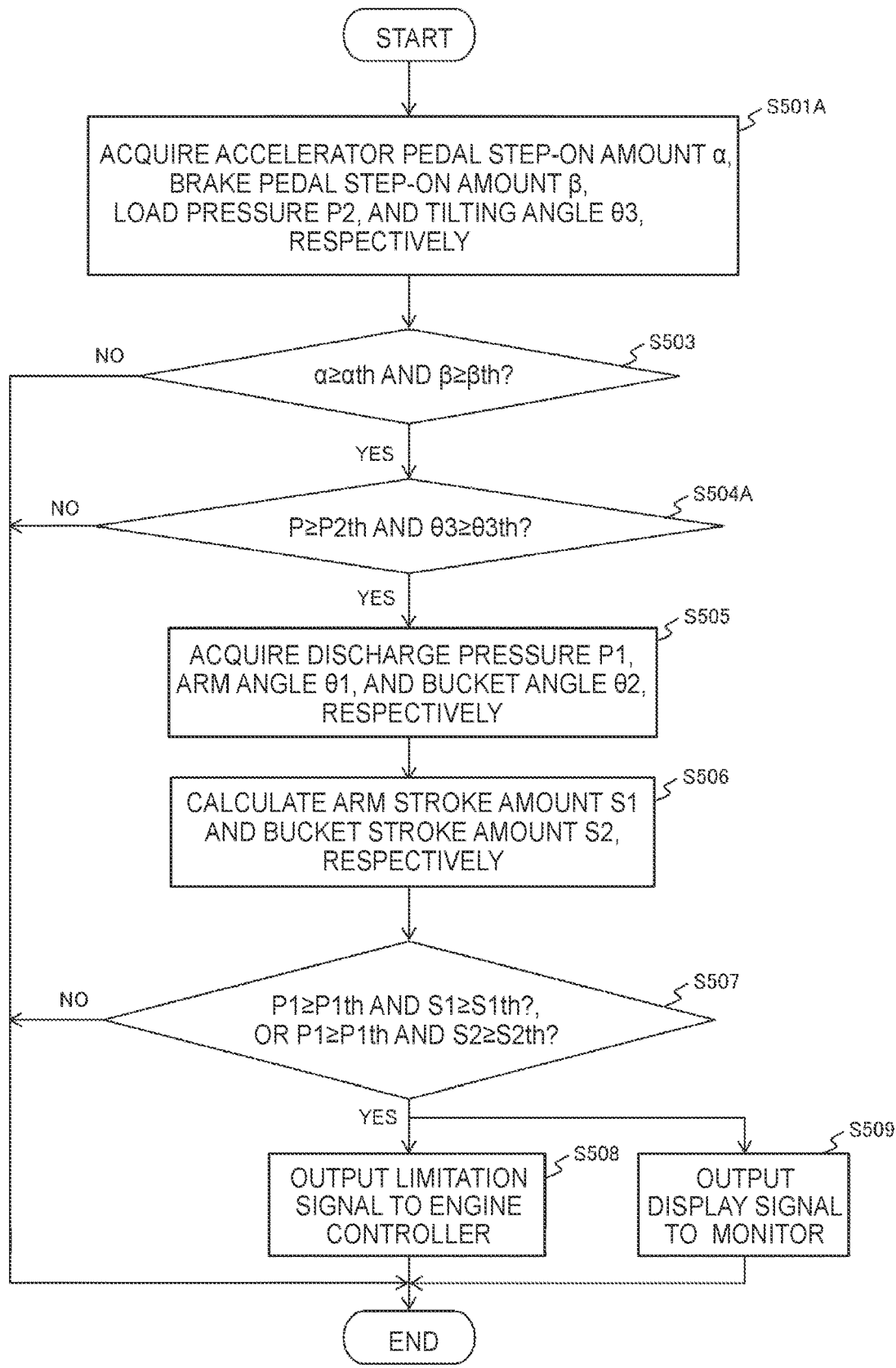
FIG. 13 is a flowchart illustrating a flow of processing executed by the vehicle body controller according to the second embodiment.

As illustrated in FIG. 13, firstly, the data acquisition section 51A detects the accelerator pedal step-on amount $\alpha$ detected by the first step-on amount sensor 35, the brake pedal step-on amount $\beta$ detected by the second step-on amount sensor 36, the load pressure P2 detected by the pressure sensor 39, and the tilting angle $\theta 3$ detected by the tilting angle sensor 38, respectively (step S501A).

Next, the processing proceeds to step S503, and the limitation condition determination section 54A determines whether the accelerator pedal step-on amount $\alpha$ acquired in step S501A is equal to or more than the first step-on amount threshold value $\alpha$th and the brake pedal step-on amount $\beta$ is equal to or more than the second step-on amount threshold value $\beta$th.

In step S503, when determining that the accelerator pedal step-on amount $\alpha$ is equal to or more than the first step-on amount threshold value $\alpha$th and the brake pedal step-on amount $\beta$ is equal to or more than the second step-on amount threshold value $\beta$th ($\alpha \geq \alpha$th and ($\beta \geq \beta$th) (step S503/YES), the limitation condition determination section 54A subsequently determines whether the load pressure P2 acquired in step S501A is equal to or more than a pressure threshold value P2th and the tilting angle $\theta 3$ is equal to or more than a tilting angle threshold value $\theta 3$th (step S504A).

Here, the pressure threshold value P2th corresponds to a sixth threshold value set based on a relief pressure of the HST drive circuit, and is set to, for example, about 90% of the relief pressure. The tilting angle threshold value $\theta 3$th corresponds to a seventh threshold value set based on an upper limit value of the tilting angle of the HST pump 61 (tilting upper limit amount), and is set to, for example, about 90% of the upper limit angle.

That is, in the present embodiment, the first limitation condition includes that the accelerator pedal step-on amount $\alpha$ is equal to or more than the first step-on amount threshold value $\alpha$th ($\alpha \geq \alpha$th) and the brake pedal step-on amount $\beta$ is equal to or more than the second step-on amount threshold value $\beta$th ($\beta \geq \beta$th), and also that the load pressure P2 is equal to or more than the pressure threshold value P2th (P2$\geq$P2th) and the tilting angle $\theta$3 is equal to or more than the tilting angle threshold value $\theta$3th ($\theta$3$\geq\theta$3th).

In step S504A, when it is determined that the load pressure P2 is equal to or more than the pressure threshold value P2th and the tilting angle $\theta$3 is equal to or more than the tilting angle threshold value $\theta$3th (P$\geq$P2th and $\theta$3$\geq\theta$3th) (step S504A/YES), the processing proceeds to step S505 and later. On the other hand, in step S504A, when it is determined that the load pressure P2 is less than the pressure threshold value P2th or the tilting angle $\theta$3 is less than the tilting angle threshold value $\theta$3th (P2<P2th or $\theta$3<$\theta$3th) (step S504A/NO), the processing in the vehicle body controller 5A is ended.

Thus, in the case where the HST traveling drive system is employed as the traveling drive system of the wheel loader 1, in the same manner as the torque converter traveling drive system, when the first limitation condition and the second limitation condition are satisfied, the vehicle body controller 5A limits the upper limit rotational speed of the engine 41. This enables the wheel loader 1 to reduce the fuel consumption while maintaining the working efficiency.

In the above, the present invention has been described with reference to each of the embodiments of the present invention. The invention is not limited to each of the embodiments described above, and various modifications may be made therein. For example, each of the embodiments are described in detail herein for the purpose of clarity and a concise description, and the present invention is not necessarily limited to those including all the features described above. Furthermore, some of the features according to a predetermined embodiment can be replaced with other features according to the separate embodiments, and other features can be added to the configuration of a predetermined embodiment. Still further, some of the features can include other features of the separate embodiments, be deleted, and/or replaced.

For example, in the embodiments described above, the wheel loader 1 has been described as one of the aspects of construction machines, however, the present invention is not limited thereto. For example, the present invention can be applied to other work vehicles such as forklifts.

Furthermore, as described in the embodiments above, there is no particular limitation on a driving method relating to the traveling of the wheel loader 1. The present invention can be applied to either the torque converter type or the HST type.

REFERENCE SIGNS LIST

1: wheel loader (work vehicle)
2: working device
5, 5A: vehicle body controller (controller)
11, 11A: front wheel (wheel)
11, 11B: rear wheel (wheel)
12A: monitor (notification device)
22: lift arm cylinder (hydraulic cylinder)
24: bucket cylinder (hydraulic cylinder)
41: engine
42: torque converter
44: loading hydraulic pump
51: accelerator pedal
52: brake pedal
$\alpha$: accelerator pedal step-on amount
$\alpha$th: first step-on amount threshold value (first threshold value)
$\beta$: brake pedal step-on amount
$\beta$th: second step-on amount threshold value (second threshold value)
e: torque converter speed ratio
eth: speed ratio threshold value (third threshold value)
P1: discharge pressure
P1th: discharge pressure threshold value (fourth threshold value)
S1, S2: stroke amount
S1th, S2th: stroke amount threshold value (fifth threshold value)

The invention claimed is:

1. A work vehicle comprising:
   a vehicle body provided with a plurality of wheels;
   an engine mounted on the vehicle body;
   a torque converter for amplifying a torque transmitted from the engine;
   an accelerator pedal for adjusting a rotational speed of the engine;
   a brake pedal for adjusting a braking force applied to the plurality of wheels;
   a working device attached to the vehicle body;
   a hydraulic cylinder for driving the working device;
   a loading hydraulic pump driven by the engine and supplying a hydraulic oil to the hydraulic cylinder; and
   a controller configured to control the engine,
   wherein the controller is configured to:
   limit an upper limit rotational speed of the engine based on a step-on amount of the accelerator pedal, a step-on amount of the brake pedal, a torque converter speed ratio that is a ratio of a rotational speed of the torque converter, a discharge pressure of the loading hydraulic pump, and a stroke amount of the hydraulic cylinder.

2. The work vehicle according to claim 1, wherein the controller is configured to limit the upper limit rotational speed of the engine in a case where:
   the step-on amount of the accelerator pedal is equal to or more than a first threshold value set based on an upper limit value thereof;
   the step-on amount of the brake pedal is equal to or more than a second threshold value set based on an upper limit value thereof;
   the torque converter speed ratio is equal to or less than a third threshold value set based on the torque converter speed ratio during stall of the engine;
   the discharge pressure of the loading hydraulic pump is equal to or more than a fourth threshold value set based on a relief pressure; and
   the stroke amount of the hydraulic cylinder is equal to or more than a fifth threshold value set based on a limit value thereof.

3. The work vehicle according to claim 1, further comprising an angle sensor for detecting an angle of the working device, wherein
   the controller is configured to calculate the stroke amount of the hydraulic cylinder based on the angle of the working device detected by the angle sensor.

4. The work vehicle according to claim 1, further comprising a notification device for providing a notification that the upper limit rotational speed of the engine is being limited by the controller, wherein
   the controller is configured to output a notification signal relating to the notification to the notification device in a case of limiting the upper limit rotational speed of the engine.

* * * * *